(12) United States Patent
Li

(10) Patent No.: US 9,977,295 B2
(45) Date of Patent: May 22, 2018

(54) DISPLAY SUBSTRATE AND MANUFACTURING METHOD THEREOF, DISPLAY DEVICE

(71) Applicant: BOE TECHNOLOGY GROUP CO., LTD., Beijing (CN)

(72) Inventor: Mingchao Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 22 days.

(21) Appl. No.: 14/774,389

(22) PCT Filed: Dec. 4, 2014

(86) PCT No.: PCT/CN2014/093061
§ 371 (c)(1),
(2) Date: Sep. 10, 2015

(87) PCT Pub. No.: WO2016/015425
PCT Pub. Date: Feb. 4, 2016

(65) Prior Publication Data
US 2016/0202562 A1   Jul. 14, 2016

(30) Foreign Application Priority Data

Aug. 1, 2014 (CN) .......................... 2014 1 0377321

(51) Int. Cl.
*G02F 1/137* (2006.01)
*G02F 1/1343* (2006.01)
(Continued)

(52) U.S. Cl.
CPC ........ *G02F 1/134309* (2013.01); *G02F 1/137* (2013.01); *G02F 1/1337* (2013.01);
(Continued)

(58) Field of Classification Search
CPC ........... G02F 2001/13793; G02F 1/137; G02F 1/134363
See application file for complete search history.

(56) References Cited

U.S. PATENT DOCUMENTS

2007/0070282 A1* 3/2007 Shibahara ......... G02F 1/134363
349/141
2011/0069263 A1* 3/2011 Takeda .............. G02F 1/134363
349/122
(Continued)

FOREIGN PATENT DOCUMENTS

CN   102368126 A   3/2012
CN   102681195 A   9/2012
(Continued)

OTHER PUBLICATIONS

First Chinese Office Action dated Jun. 1, 2016, Appln. No. 201410377321.3.
(Continued)

*Primary Examiner* — Kendrick Hsu
(74) *Attorney, Agent, or Firm* — Ladas & Parry LLP

(57) ABSTRACT

A display substrate (20) includes: a blue phase liquid crystal layer (25) and one or more sets of driving electrodes for driving the blue phase liquid crystal layer (25) in dark state; each set of the driving electrodes include two hetero-potential electrodes (21, 22), and the two hetero-potential electrodes (21, 22) generate an electric field at the blue phase liquid crystal layer (25) with a non-zero component in a first direction that is perpendicular to the polarization direction of incident light. This display substrate can reduce dark state light leakage and enhance display quality of devices. A manufacturing method for the display substrate (20) and a display device are disclosed.

5 Claims, 3 Drawing Sheets

(51) Int. Cl.
*G02F 1/1337* (2006.01)
*G02F 1/1341* (2006.01)
*G02F 1/1347* (2006.01)

(52) U.S. Cl.
CPC ........ *G02F 1/1341* (2013.01); *G02F 1/13439* (2013.01); *G02F 1/13471* (2013.01); *G02F 1/134363* (2013.01); *G02F 2001/13793* (2013.01)

(56) References Cited

U.S. PATENT DOCUMENTS

| | | | | |
|---|---|---|---|---|
| 2013/0120679 | A1* | 5/2013 | Qin | G02F 1/134363 349/42 |
| 2014/0160414 | A1 | 6/2014 | Kubota et al. | |
| 2014/0300847 | A1* | 10/2014 | Liu | G02F 1/133528 349/103 |
| 2015/0301364 | A1 | 10/2015 | Feng | |
| 2015/0309343 | A1 | 10/2015 | Li | |
| 2016/0026014 | A1 | 1/2016 | Zhao | |

FOREIGN PATENT DOCUMENTS

| | | |
|---|---|---|
| CN | 103383505 A | 11/2013 |
| CN | 103499900 A | 1/2014 |
| CN | 203444208 U | 2/2014 |
| CN | 103792742 A | 5/2014 |
| CN | 104181736 A | 12/2014 |
| KR | 20130067339 A | 6/2013 |

OTHER PUBLICATIONS

International Search Report and Written Opinion both dated May 6, 2015; PCT/CN2014/093061.
Second Chinese Office Action dated Dec. 13, 2016; Appln. No. 201410377321.3.

* cited by examiner

DISPLAY SUBSTRATE AND MANUFACTURING METHOD THEREOF, DISPLAY DEVICE

TECHNICAL FIELD

Embodiments of the present invention relate to a display substrate and a manufacturing method thereof, and a display device.

BACKGROUND

In an Advanced-Super Dimensional Switching (ADS) technology, a multi-dimensional electric field is formed with both a parallel electric field produced at edges of pixel electrodes or common electrodes on the same plane and a longitudinal electric field produced between pixel electrodes and common electrodes, so liquid crystal molecules at all orientations, which are located directly above the pixel electrodes or common electrodes and between the pixel electrodes or common electrodes in a liquid crystal cell, can be rotated and aligned, which enhances the work efficiency of planar-oriented liquid crystals and increases light transmittance. The Advanced-Super Dimensional Switching technology can improve the picture quality of TFT-LCDs and has advantages of high transmissivity, wide viewing angles, high opening ratio, low chromatic aberration, low response time, no push Mura, etc.

SUMMARY

Embodiments of the present invention provide a display substrate and a manufacturing method thereof, and a display device that can reduce dark state light leakage and enhance display quality of devices.

At least one embodiment of the present invention provides a display substrate including a blue phase liquid crystal layer and one or more sets of driving electrodes for driving the blue phase liquid crystal layer in dark state, wherein, each set of the driving electrodes include two hetero-potential electrodes and the electric field generated by the two hetero-potential electrodes at the blue phase liquid crystal layer has a non-zero component in a first direction perpendicular to a polarization direction of incident light.

For example, an electric field generated by the two hetero-potential electrodes at the blue phase liquid crystal layer forms an angle A with the polarization direction of incident light, A=45° or A=135°.

For example, the display substrate may be further provided with an alignment layer; and the blue phase liquid crystal layer is disposed under the alignment layer.

For example, the driving electrodes may be disposed under the blue phase liquid crystal layer.

For example, the driving electrodes may be slit-like electrodes and two adjacent slit-like electrodes are two hetero-potential electrodes in a set of the driving electrodes respectively.

For example, one hetero-potential electrode in a set of the driving electrodes is a plate electrode and the other hetero-potential electrode is a slit-like electrode.

An embodiment of the present invention further provides a display device including any of the above-mentioned display substrates.

For example, the display device may further include: an opposed substrate disposed oppositely to the display substrate and liquid crystal disposed between the display substrate and the opposed substrate; wherein the opposed substrate is provided with common electrodes and pixel electrodes thereon.

On the other hand, an embodiment of the present invention further provides a manufacturing method of display substrate including: forming a blue phase liquid crystal layer; and forming one or more sets of driving electrodes, the driving electrodes being configured to drive the blue phase liquid crystal layer in dark state, each set of the driving electrodes comprising two hetero-potential electrodes and the two hetero-potential electrodes generating an electric field at the blue phase liquid crystal layer with a non-zero component in a first direction that is perpendicular to the polarization direction of incident light.

For example, the manufacturing method may further include forming an alignment layer; and the method performs the step of forming the blue phase liquid crystal layer before the step of forming the alignment layer.

For example, in the manufacturing method, the step of forming driving electrodes is conducted first, then forming the blue phase liquid crystal layer and finally forming the alignment layer.

For example, the step of forming driving electrodes may include forming slit-like electrodes, and two adjacent slit-like electrodes are two hetero-potential electrodes in a set of the driving electrodes respectively.

For example, forming driving electrodes may include: forming a plate electrode as one hetero-potential electrode in a set of the driving electrodes; forming an insulation layer on the plate electrode; forming a slit-like electrode on the insulation layer as the other hetero-potential electrode in a set of the driving electrodes.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

10—top substrate, 11—common electrode, 12—pixel electrode, 13—top polarizing sheet, 14—insulation layer, 20—bottom substrate, 21—hetero-potential electrode, 22—hetero-potential electrode, 23—bottom polarizing sheet, 24—insulation layer, 25—blue phase liquid crystal layer, 27—alignment layer, 30—liquid crystal.

DETAILED DESCRIPTION

The technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
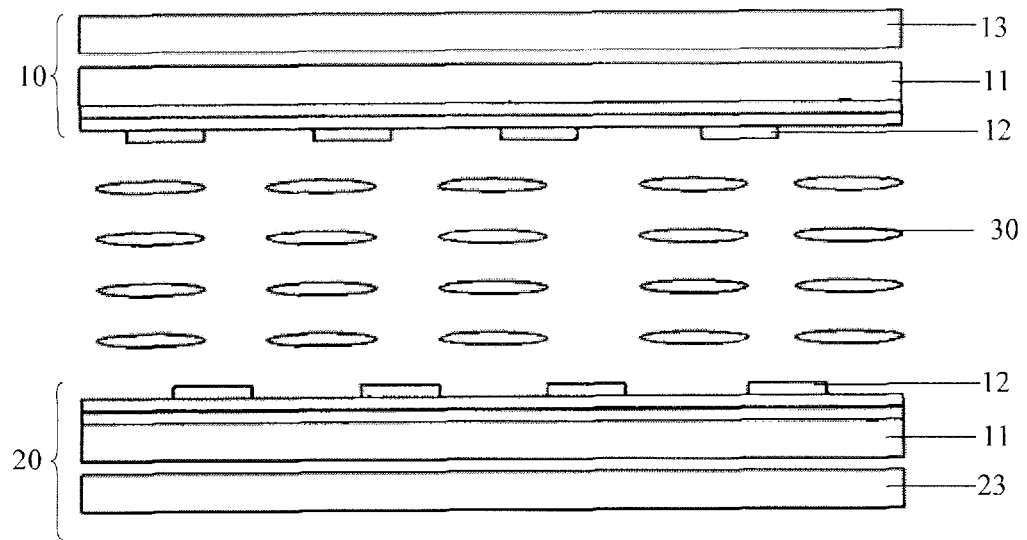
FIG. 1 shows an ADS display device driven with both top and bottom substrates.

In order to further improve the response time, based on the ADS display technology at present, a solution has been proposed which has driving electrodes disposed on both the top and bottom substrates. As illustrated in FIG. 1, an ADS display device is driven with both the top and bottom substrates and includes: a liquid crystal cell, which is formed by a top substrate 10 and a bottom substrate 20 with liquid crystal 30 sandwiched therebetween; a top polarizing sheet 13 disposed over the liquid crystal cell; a bottom polarizing sheet 23 disposed under the liquid crystal cell; common electrodes 11 and pixel electrodes 12 disposed on the top substrate 10 and common electrodes 11 and pixel electrodes 12 disposed on bottom substrate 20 as well. The liquid crystal 30 rotates under the combined action of electric fields formed by these electrodes. The inventor has noted that in the manufacturing process of the ADS display device driven with both top and bottom substrate, due to the limitation of process, defects such as local orientation inconsistency in the alignment layers or alignment shift would inevitably occur, which can result in dark state light leakage and thereby impacting display quality of devices.

An embodiment of the present invention provides a display substrate including a blue phase liquid crystal layer and one or more sets of driving electrodes for driving the blue phase liquid crystal layer in dark state. Each set of the driving electrodes includes two hetero-potential electrodes that generate electric fields in the blue phase liquid crystal layer with non-zero components in the first direction, and the first direction is perpendicular to the polarization direction of incident light.

It should be noted that the first direction being perpendicular to the polarization direction of incident light refers to that the first direction is perpendicular to the polarization direction of incident light in the plane parallel to the substrate.

The display substrate provided in an embodiment of the present invention is applicable to flat field display devices. The flat field display device described herein means that the electric field for driving liquid crystal rotation to display is a parallel electric field parallel to the substrate. At present, the planar electric field display technologies mainly include: in-plane switching (IPS), advanced-super dimensional switching (ADS), etc. For an in-plane field display device, the rotation of liquid crystal molecules involves rotation in a plane (X-Y axis), and the liquid crystal molecules are always parallel to the screen regardless of the state although the rotation directions of molecules in energized/normal state are different. In dark state, the alignment direction of long axes of liquid crystal molecules in liquid crystal cell is oriented along the alignment layer, that is, the polarization direction of incident light (consistent with the polarizing direction of the bottom polarizing sheet) is consistent with the alignment direction of long axes of liquid crystal molecules in the liquid crystal cell in dark state. Dark state light leakage tends to occur due to various reasons.

On the display substrate provided in an embodiment of the present invention, a thin layer of blue phase liquid crystal and driving electrodes for driving blue phase liquid crystal are additionally formed, which can address the above problem. The operation principle for blue phase liquid crystal is based on Kerr effect as describe specifically below. Under the action of the applied electric field (for example, the electric field perpendicular to the polarization direction of incident light), the blue phase liquid crystal becomes an optically uniaxial crystal with an optical axis direction being parallel to the electric field direction. When linearly polarized light passes the blue phase liquid crystal in a direction perpendicular to the electric field, it will be divided into two rays of linearly polarized light, one of which has a light vector along the direction of electric field and the other has a light vector perpendicular to the electric field, and their refractive indices are referred to as ordinary refractive index $n_o$ and extraordinary refractive index $n_e$ respectively. Whether the blue phase liquid crystal is positive or negative birefringent substance depends on whether the value of $n_e$-$n_o$ is positive or negative: $n_e$-$n_o$=$\lambda KE^2$, wherein $\lambda$ is the wavelength of incident light, K is the Kerr constant, and E is the applied electric field. $n_e$-$n_o$ increases with the square of applied electric field, and the intensity of transmitted light increases also. With the Kerr effect of blue phase liquid crystal, light modulation with applied electric field can be realized.

In case of the blue phase liquid crystal layer described in the present embodiment, in bright state, driving electrodes do not generate any electric field and the blue phase liquid crystal behaves as an isotropic medium and is transparent to the incident polarized light (backlight). In dark state, driving electrodes generate electric field, for example, perpendicular to the polarization direction of the incident light, the blue phase liquid crystal layer becomes an optically uniaxial crystal of anisotropy. Since the direction of electric field is perpendicular to the polarization direction of the incident light, polarized light will has its polarization direction changed after passing the blue phase liquid crystal layer, and the polarization direction forms a certain angle with the alignment direction of long axes of liquid crystal molecules in liquid crystal cell in dark state. Because the polarization direction of incident light is perpendicular to the direction of liquid crystal in liquid crystal layer, the incident light can not transmit the liquid crystal cell, thereby reducing dark state light leakage and enhancing display quality of devices.

In order to facilitate understanding, the above description only considered the case of an electric field perpendicular to the polarization direction of incident light. In practice, here, because the operation principle of the blue phase liquid crystal layer is based on Kerr effect, it is only required that the electric field generated by the two hetero-potential electrodes of the present embodiment at the blue phase liquid crystal layer (electric field generated by driving electrodes hereinafter) has a non-zero component in the direction perpendicular to the polarization direction of incident light (namely the first direction) to realize the above-mentioned effect.

In a specific embodiment, the electric field generated by two hetero-potential electrodes at the blue phase liquid crystal forms an angle A with the polarization direction of incident light. The angle A may be 45 or 135 degrees (A=45° or A=135°), because when A is 45° or A=135°, the transmission capability of long axes and short axes of anisotropic blue phase liquid crystal molecules is strongest, the polarization direction of light after the incident light passing the blue phase liquid crystal layer is changed mostly, and the transmittance of incident light becomes the minimum after passing the alignment layer and liquid crystal in the liquid crystal cell. Therefore, when A=45° or A=135°, the improvement effect for dark state light leakage is the best. For an in-plane field display device, the polarization direction of incident light is consistent with the alignment layer and is also consistent with the alignment direction of long axes of liquid crystal molecules in the liquid crystal cell in dark state.

Figure 2:
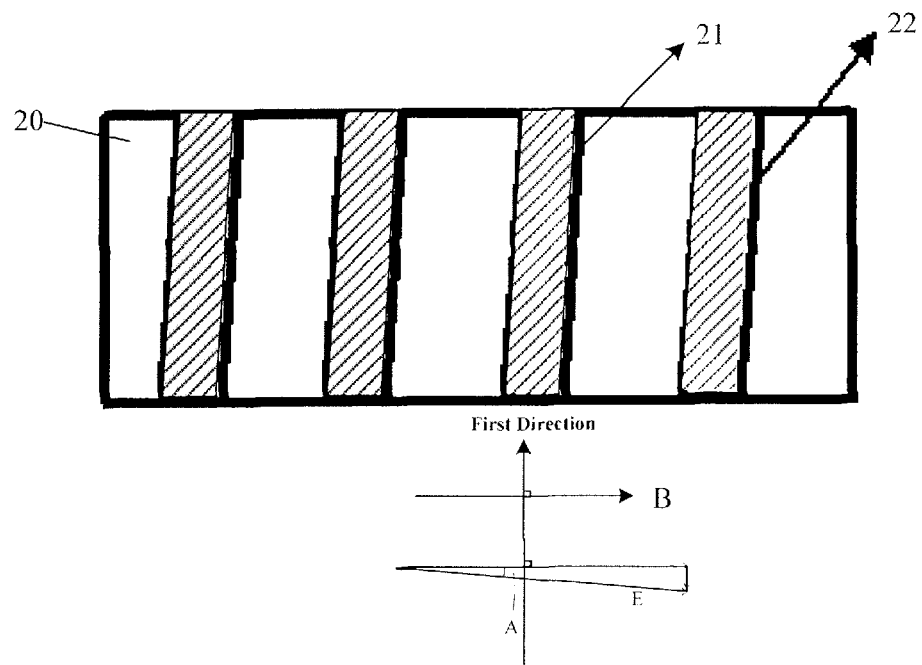
FIG. 2 is a schematic diagram of an electric field generated by driving electrodes and a polarization direction of incident light in a display substrate provided in embodiment I of the present invention.

In a liquid crystal display, light emitted by the backlight module is incident onto the substrate perpendicularly via a light guiding plate. However, after passing the polarizer sheet, the perpendicular light is converted into polarized light polarizing in a certain direction (consistent with the polarization direction of polarizer sheet). In order to have an angle A, A≠0° and A≠180°, formed between the electric field generated by driving electrodes at the blue phase liquid crystal layer and the polarization direction of incident light, it is better to dispose the two hetero-potential electrodes constituting driving electrodes in the same plane. For example, as illustrated in FIG. 2, the driving electrodes are configured as slit-like electrodes, and two adjacent slit-like electrodes on the bottom substrate 20 are provided as two hetero-potential electrodes in a set of driving electrodes respectively, that is, the hetero-potential electrode 21 and the hetero-potential electrode 22 in the figure have opposite electric properties in operation. The direction of the arrow B in FIG. 2 represents the polarization direction of the incident light. If enhanced electric field is desired, driving electrodes in each set may be disposed very close.

The two hetero-potential electrodes constituting driving electrodes in the above-mentioned FIG. 2 are disposed on the same layer, and of course may be on different layers as well. For example, one of the hetero-potential electrodes is a slit-like electrode, and the other is a plate electrode with an insulation layer disposed between the two electrodes, just like the pixel electrodes and common electrodes in an ADS mode.

Furthermore, the array substrate in an in-plane electric field display device generally includes pixel electrodes and common electrodes that can serve as the two hetero-potential electrodes constituting the driving electrodes respectively. Here, the design of specific patterns of pixel electrodes and common electrodes should satisfy the requirements for them to function as driving electrodes in addition to satisfying requirements for them to function as pixel electrodes and common electrodes, that is, the electric field generated by pixel electrodes and common electrodes in dark state at blue phase liquid crystal layer has a non-zero component in the first direction. In addition to this, their specific manufacturing may be implemented with common technologies. For example, the resulting display device can be driven in a time division mode. In dark state, pixel electrodes and common electrodes function as two hetero-potential electrodes of the driving electrodes respectively; and in bright state, pixel electrodes and common electrodes are loaded with display signals for the operation of displaying.

The display substrate provided in the embodiment of the present invention can reduce dark state light leakage and enhance display quality of devices. Because the specific locations and implementations of blue phase liquid crystal layer and driving electrodes do not influence the implementation effects of technical solution of the present embodiment, the embodiment of the present invention do not limit this in any way, and it may be any implementation known by those skilled in the art.

The embodiment of the present invention can alleviate dark state light leakage of dual substrate display devices or single substrate display devices, which will be described in detail below with respect to a dual substrate display device as an example.

Figure 3:
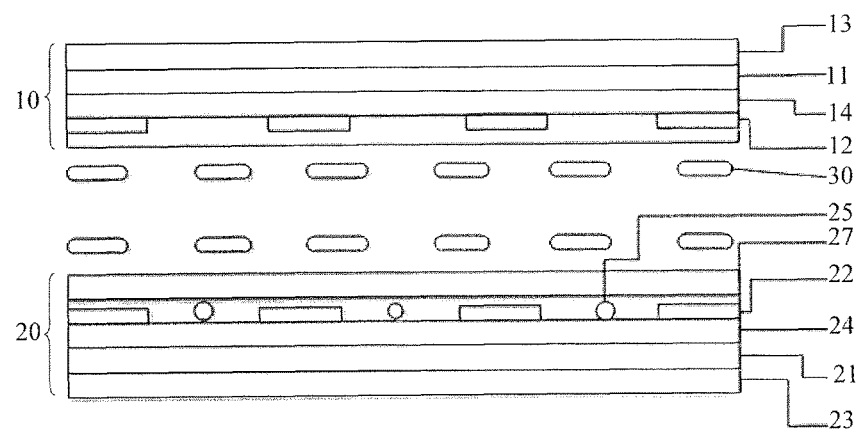
FIG. 3 is a structure diagram I of an ADS display device driven with both top and bottom substrates provided in embodiment I of the present invention (in bright state)
Figure 4:
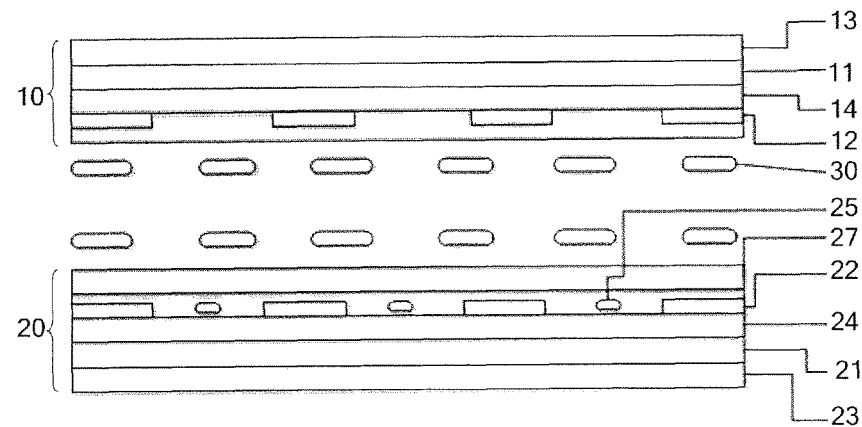
FIG. 4 is a structure diagram II of an ADS display device driven with both top and bottom substrates provided in embodiment I of the present invention (in dark state)

As illustrated in FIG. 3 and FIG. 4, an embodiment of the present invention provides an ADS display device driven with both the top and bottom substrates, including a top substrate 10 and bottom substrate 20 assembled to form a cell. The top substrate 10 is provided with common electrodes 11, an insulation layer 14 and pixel electrodes 12, and the bottom substrate 20 is provided with hetero-potential electrodes 21, an insulation layer 24 and hetero-potential electrodes 22. The hetero-potential electrodes 22 are slit-like electrodes, the hetero-potential electrodes 22 are plate electrodes, and an alignment layer 27 is disposed on the hetero-potential electrodes 22. The display device of the present embodiment further includes a blue phase liquid crystal layer 25 disposed under the alignment layer 27. Common electrodes 11 and pixel electrodes 12 disposed on the top substrate 10 drive the liquid crystal 30 for display; and hetero-potential electrodes 21 and hetero-potential electrodes 22 disposed on the bottom substrate 20 drive the blue phase liquid crystal layer 25 in dark state to reduce dark state light leakage.

In manufacturing, after completion of other steps for the bottom substrate 20 and before formation of the alignment layer 27, blue phase liquid crystal is coated to form the blue phase liquid crystal layer 25, and then the alignment layer 27 is formed. The process steps for forming other layers such as the insulation layer, the hetero-potential electrode layer, etc. on the bottom substrate 20 are often in a harsh environment or under high temperature or require etching or gas impact. Therefore, disposing the blue phase liquid crystal layer 25 under the alignment layer 27 has the benefit that the blue phase liquid crystal layer 25, after being formed, only needs to experience the process of forming alignment layer 27 and will not undergo harsh environment again, thereby avoiding damage to the blue phase liquid crystal layer 25.

Based on the same reason, the driving electrodes are also disposed under the blue phase liquid crystal layer 25. For example, the layer on which hetero-potential electrodes 21 are located in FIG. 3 may also be omitted. For example, the hetero-potential electrodes 21 and the hetero-potential electrodes 22 are disposed on the same layer as illustrated in FIG. 2 for the purpose of saving processing steps and reducing the thickness of the bottom substrate.

The ADS display device as illustrated in FIG. 3 is in the bright state in which driving electrodes do not generate electric field, the blue phase liquid crystal behaves as an isotropic medium, and the blue phase liquid crystal layer is transparent for the incident polarized light (backlight). When the ADS display device as illustrated in FIG. 4 is in dark state, driving electrodes generate an electric field perpendicular to the polarization direction of the incident light, the blue phase liquid crystal layer becomes an optically uniaxial crystal of anisotropy that will change the polarization direction of the incident light.

An embodiment of the present invention provides a display substrate applicable to an in-plane field display device. A layer of blue phase liquid crystal is coated first before coating PI (Polyimide, a common material for an alignment layer). Basically no further steps are required for the purpose of reducing dark state light leakage and enhancing display quality of devices.

An embodiment of the present invention further provides a display device including any of the above-mentioned display substrates. The display device can obtain a higher display quality due to the reduced dark state light leakage. The display device may be any product or component with display function such as a liquid crystal panel, a piece of electronic paper, a cellphone, a slab computer, a TV set, a display, a notebook computer, a digital picture frame and a navigator.

Furthermore, the display device provided in the present invention further include an opposed substrate (namely a top substrate 10) disposed oppositely to the display substrate and liquid crystal disposed between the display substrate and the opposed substrate. The opposed substrate is provided with common electrodes and pixel electrodes thereon. The display substrate may be an array substrate or a color filter substrate, and accordingly, the opposed substrate is a color filter substrate or an array substrate.

Figure 5:
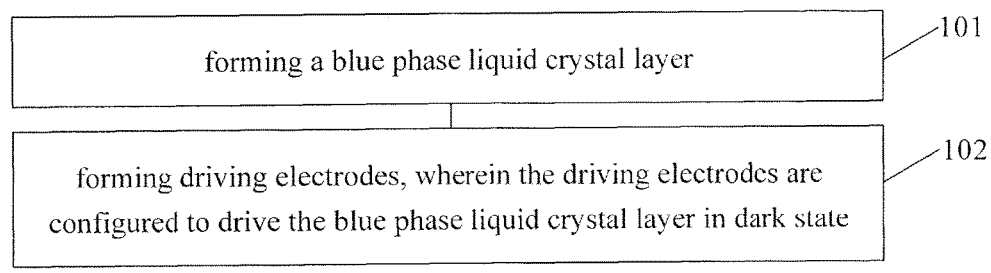
FIG. 5 is a schematic diagram I of a manufacturing method of a display substrate provided in embodiment II of the present invention.

An embodiment of the present invention further provides a manufacturing method for a display substrate as illustrated in FIG. 5, the method includes the following steps:

step 101, forming a blue phase liquid crystal layer;

step 102, forming driving electrodes. The driving electrodes are configured to drive the blue phase liquid crystal layer in dark state. Each set of the driving electrodes include two hetero-potential electrodes, and the two hetero-potential electrodes generate an electric field at the blue phase liquid crystal layer with a non-zero component in the first direction that is perpendicular to the polarization direction of incident light.

An embodiment of the present invention further provides a manufacturing method for a display substrate that reduces dark state light leakage and obtains higher display quality by, e.g., adding steps 101 and 102 of forming blue phase liquid crystal layer and driving electrodes on the basis of original steps for manufacturing array substrate. The specific locations and manner of forming blue phase liquid crystal layer and driving electrodes are not limited in the present embodiment. It is to be noted that the numbers 101 and 102 here do not represent the order of the steps but distinguish the steps.

For example, the method may further include a step of forming an alignment layer; and a step of forming blue phase liquid crystal layer before the step of forming alignment layer to avoid damage to the formed blue phase liquid crystal layer that is caused because of subsequently suffering from harsh environment again.

Figure 6:
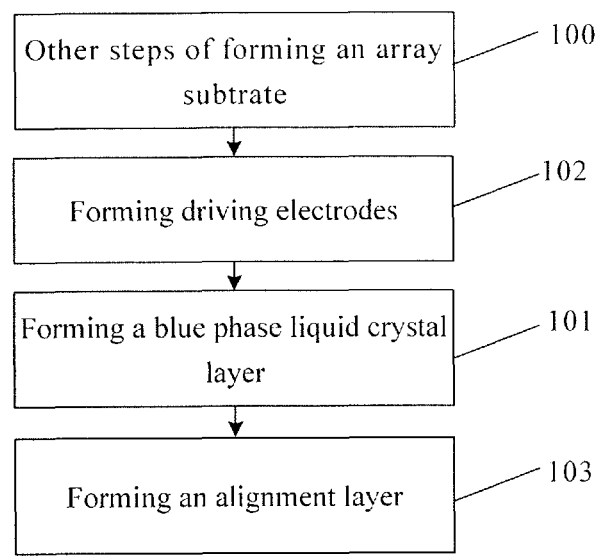
FIG. 6 is a flow chart II of a manufacturing method of a display substrate provided in embodiment II of the present invention.

For example, as illustrated in FIG. 6, it is possible to implement other steps of forming the display substrate (normal film layers except for the alignment layer) first, and then step 102 of forming driving electrodes, and step 101 of forming blue phase liquid crystal layer, and finally the step 103 of forming the alignment layer.

It is to be noted that step 102 of forming driving electrodes may include forming a plate electrode as one hetero-potential electrode of one set of driving electrodes; forming an insulation layer on the plate electrode; forming a slit-like electrode on the insulation layer as the other hetero-potential electrode in the set of driving electrodes, as illustrated in FIG. 3. Here, it is possible to adopt a method similar to that of forming pixel electrodes and common electrodes in a conventional in-plane field display device.

Alternatively, step 102 of forming driving electrodes may include forming slit-like electrodes in which two adjacent slit-like electrodes are two hetero-potential electrodes of one set of the driving electrodes respectively, as illustrated in FIG. 2. Here, it is possible to adopt a method substantially identical to that of forming conventional slit-like electrodes, however with different patterns.

In the manufacturing method of display substrate provided in the embodiment of the present invention, a layer of blue phase liquid crystal is coated first before the PI layer is coated. In addition to this, substantially no additional steps or step variations are needed for the purpose of reducing dark state light leakage and enhancing display quality of devices.

It is to be noted that technical features in embodiments of the present invention may be combined arbitrarily on the premise of no confliction. Various embodiments in the present description are all described in a progressive manner and identical and similar parts of embodiments may be referred to each other. The emphasis for each embodiment is on the difference from other embodiments. The relevant portions of the method embodiments may be referred to relevant parts of the disclosure.

For an in-plane field display device, the polarization direction of incident light (such as backlight) is consistent with the alignment direction of long axes of liquid crystal molecules in liquid crystal cell in dark state, which tends to cause dark state light leakage. Embodiments of the present invention provide a display substrate and a manufacturing method thereof, and a display device. The display substrate includes a blue phase liquid crystal layer and driving electrodes for driving blue phase liquid crystal layer in dark state. Because the blue phase liquid crystal exhibits anisotropy when applied with electric field, the polarization direction of incident light would change after passing through the blue phase liquid crystal layer to form a certain angle with the alignment direction of long axes of liquid crystal molecules in liquid crystal cell, thereby reducing dark state light leakage and enhancing display quality of devices.

What are described above is related to the illustrative embodiments of the disclosure only and not limitative to the scope of the disclosure; the scopes of the disclosure are defined by the accompanying claims.

The present application claims priority of China Patent application No. 201410377321.3 filed on Aug. 1, 2014, the content of which is incorporated herein by reference in its entirety as part of the present application.

The invention claimed is:

1. A display device comprising a display substrate comprising:
 a blue phase liquid crystal layer,
 one or more sets of driving electrodes for driving the blue phase liquid crystal layer in dark state; and
 an alignment layer, wherein, in a direction perpendicular to the display substrate, the blue phase liquid crystal layer is disposed between the alignment layer and the one or more sets of driving electrodes,
 wherein, each set of the driving electrodes include two hetero-potential electrodes, and the two hetero-potential electrodes configured to generate an electric field at the blue phase liquid crystal layer with a non-zero component in a first direction that is perpendicular to a polarization direction of incident linearly polarized light,
 wherein, the display device, further comprises an opposed substrate disposed oppositely to the display substrate and a first liquid crystal disposed between the display substrate and the opposed substrate;
 wherein the opposed substrate is provided with common electrodes and pixel electrodes thereon.

2. The display device according to claim 1, wherein an electric field generated by the two hetero-potential electrodes at the blue phase liquid crystal layer forms an angle A with the polarization direction of incident light, A=45° or A=135°.

3. The display device according to claim 1, wherein the driving electrodes are disposed under the blue phase liquid crystal layer.

4. The display device according to claim 1, herein the driving electrodes are slit-like electrodes, and two adjacent silt-like electrodes are the two hetero-potential electrodes in each set of the driving electrodes respectively.

5. The display device according to claim 1, wherein one hetero-potential electrode in a set of the driving electrodes is a plate electrode and the other hetero-potential electrode is a slit-like electrode.

* * * * *